Figure 1:
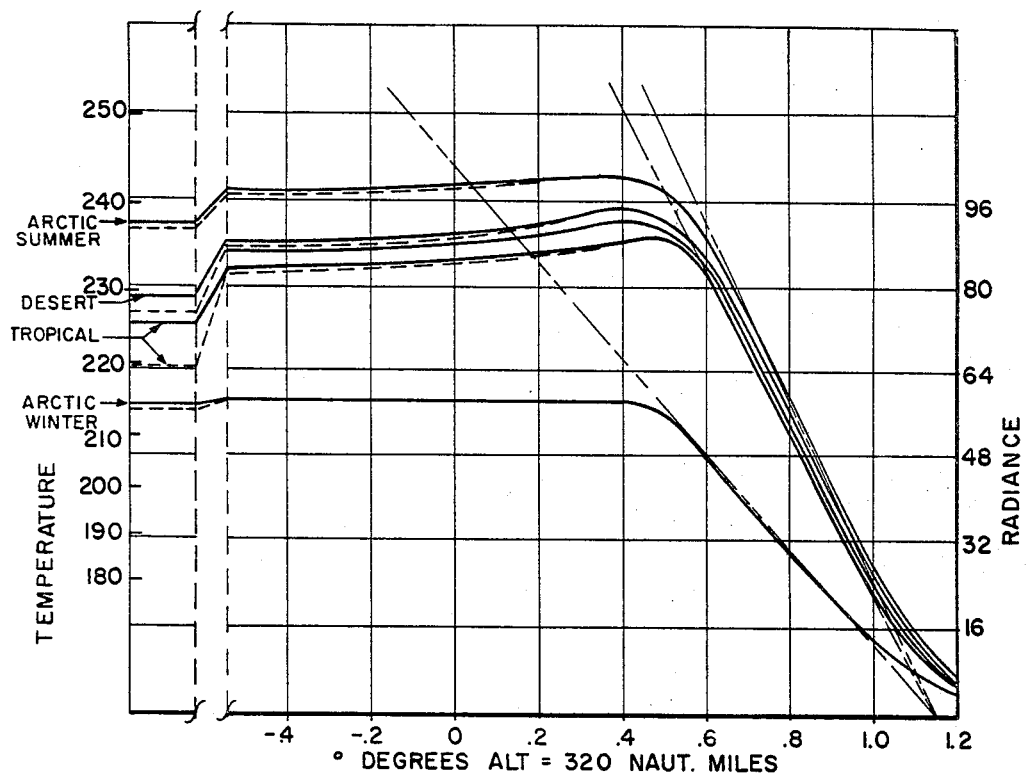

INVENTORS
KENNETH A. WARD
THOMAS FALK
FRANK SCHWARZ

Joseph Levinson
ATTORNEY

United States Patent Office 3,379,883
Patented Apr. 23, 1968

3,379,883
HIGH ACCURACY CIRCUITRY FOR CORRECTING EDGE ERRORS IN SCANNING RADIOMETERS
Kenneth A. Ward, Greenwich, Thomas Falk, Norwalk, and Frank Schwarz, Stamford, Conn., assignors to Barnes Engineering Company, Stamford, Conn., a corporation of Delaware
Filed June 1, 1964, Ser. No. 371,684
9 Claims. (Cl. 250—83.3)

This invention relates to an improved means for correcting edge errors in scanning radiometers such as horizon sensors, dimensional gages, trackers, etc.

In Patent No. 3,020,407 entitled, "Horizon Sensor," by M. M. Merlen, an infrared detector of the thermistor bolometer type is caused to be continuously scanned across the horizon. The horizon represents a sharp line of discontinuity with an abrupt change in the infrared radiation on either side, with the space side producing little radiation and the earth side producing a relatively large amount of radiation as compared to the radiation received from the space side of the scan. The sensor produces an electrical output signal in the form of repeating rectangular pulses which are shaped in accordance with the thermal discontinuity, i.e., the horizon crossings, which are compared with reference pulses provided at predetermined times during each scanning cycle. The sensor then electronically compares the time intervals between horizon crossings and the reference pulses, which produce an output signal providing information as to the attitude of the vehicle with respect to the horizon. The signal so generated may be used to correct the attitude of the vehicle in which the sensor is mounted.

One of the problems which is encountered in horizon sensors, and for that matter in any instrument which is attempting to precisely locate a point of thermal discontinuity such as dimensional gages, infrared trackers, etc., is "edge effect." Ideally an infrared detector which is scanned over an object which is hotter than its environment would produce a rectangular pulse output. This cannot be directly achieved due to detector time constant and to field-of-view errors. When the detector first strikes a thermal edge, the finite field of view of the scanning beam is not immediately filled, and radiation appears less intense as the detector field of view first encounters the object. Also, variations in the level of incoming radiation will have a profound effect on the slope of the horizon edge radiance profile. The higher the temperature at the thermal discontinuity edge the steeper the corresponding slope. One way of correcting for detector time constant and field-of-view edge errors is to provide a fast time constant detector coupled with a slow scan rate and a small detector or detector field of view. Errors due to radiation differences at edges have been treated in the aforesaid patent by providing a slice level or threshold which the detector output must exceed before a signal is generated. For many applications this has proved quite suitable, but where greater accuracy is required, compensation must be provided for different levels of radiation which are encountered to more accurately pinpoint the exact location of the thermal discontinuity.

Accordingly, it is an object of this invention to provide an improved system for correcting edge errors in scanning radiometers.

It is a further object of this invention to provide a high-accuracy system for correcting edge errors in scanning radiometers.

Still another object of this invention is to provide an improved horizon sensor which under worst case conditions is capable of obtaining accuracies which are an order of magnitude better than known systems.

In carrying out this invention, a system is provided for correcting edge errors in a scanning radiometer which in a given scan cycle crosses at least one sharp point of thermal discontinuity. The system includes an infrared sensor which produces signals having sloping leading and trailing edges corresponding to edge errors produced by the sensor as it scans thermal discontinuities. Two slice levels are set on the sloping edges of the signals and the time intervals between these levels is determined and utilized to determine the edge error. Analog or digital means may be employed to determine the edge error and embodiments of each are disclosed. The system may be used for determining errors on either edge of the signals or both.

Figure 2:
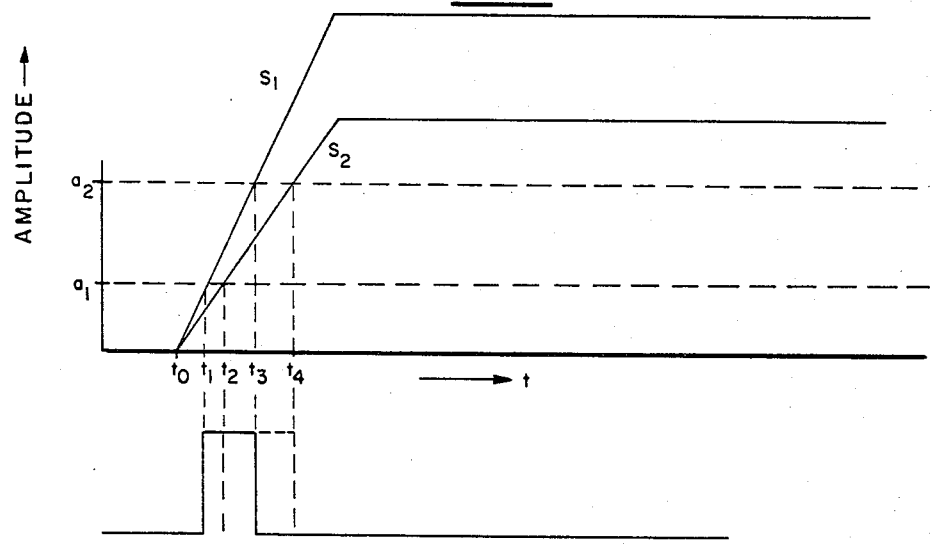
Figure 3:
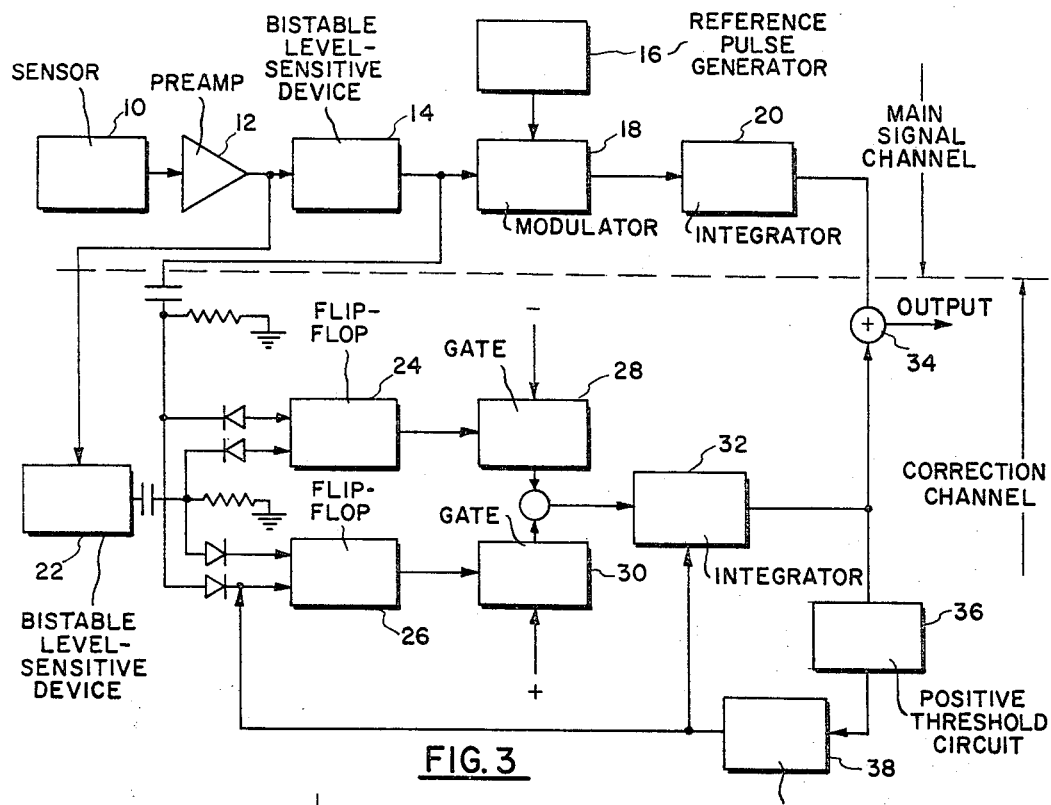
Figure 4:
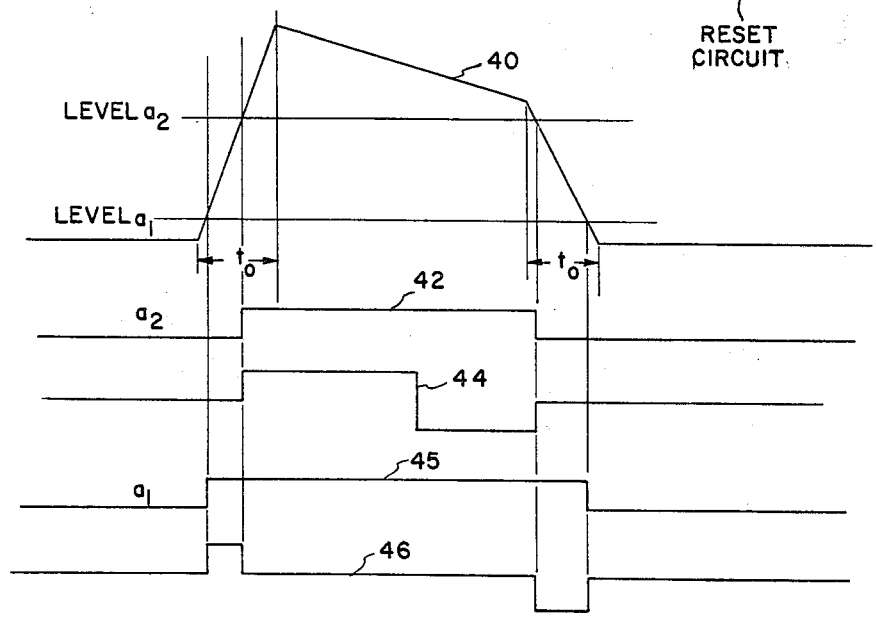
Figure 5:
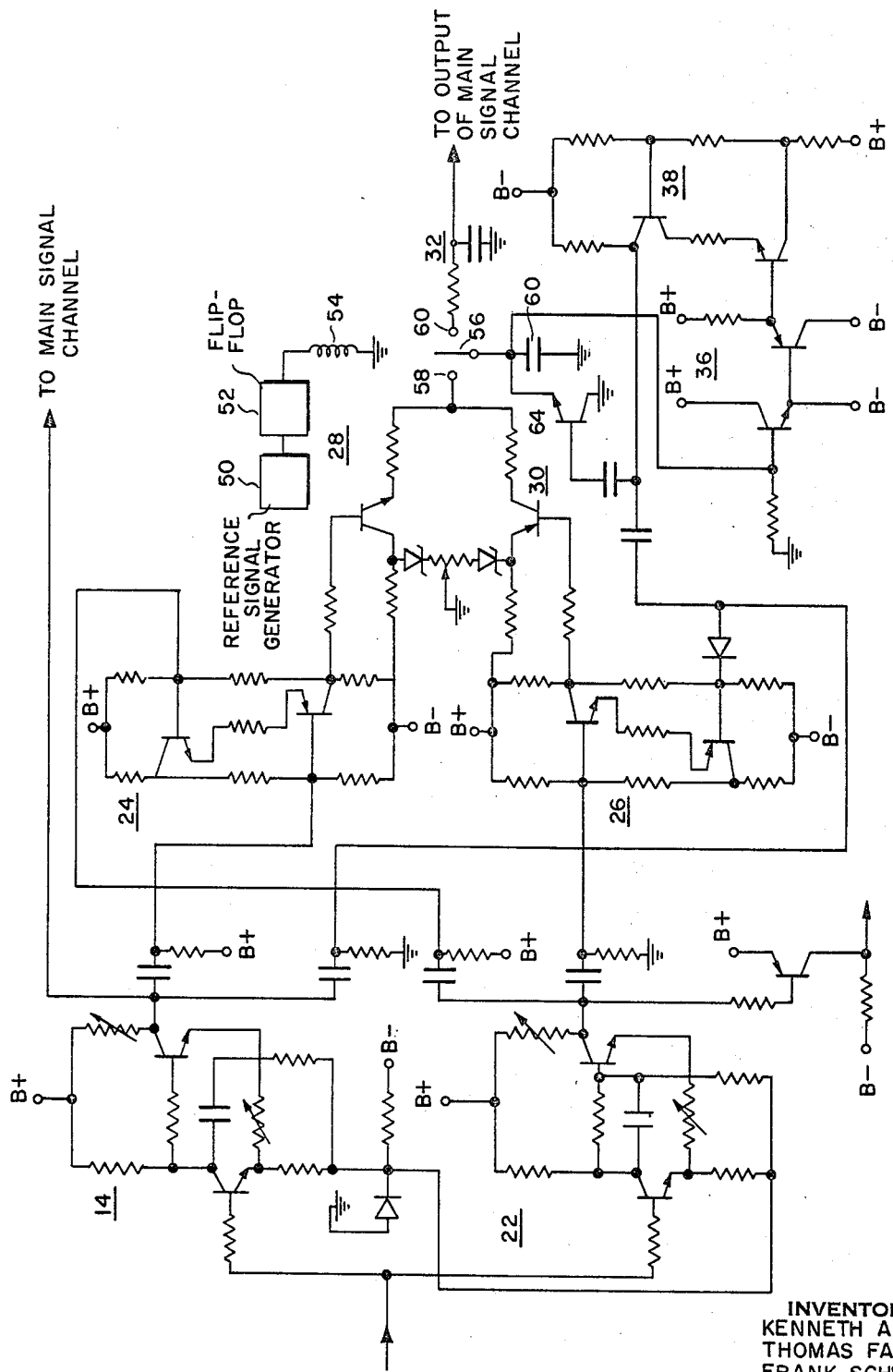
Figure 6:
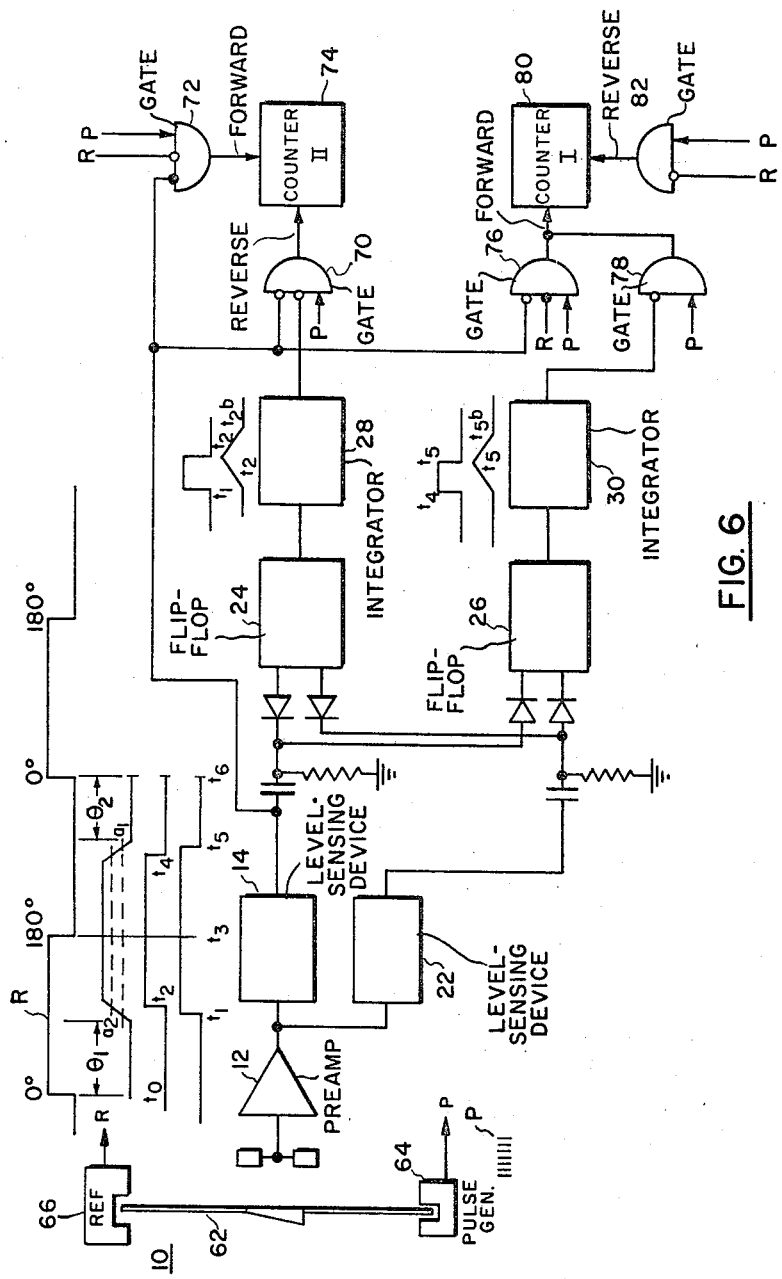

The invention, both as to organization and method of operation, together with other objects and advantages thereof, may best be understood by reference to the following description taken in connection with the accompanying drawings, in which:

FIG. 1 shows a graph of radiance for the carbon dioxide band for horizon crossings at various geographic locations around the earth, FIG. 2 shows a graph of amplitude versus time which is useful in demonstrating the principles of error correction as embodied in this invention, FIG. 3 is a system block diagram of the present invention, FIG. 4 shows a series of waveforms useful in the explanation of the operation of the system as shown in FIG. 3, FIG. 5 is a schematic diagram of the correction channel which is illustrative of the type of circuit which may be utilized for carrying out the present invention, and FIG. 6 is a block diagram of a digital processing error correcting system.

Although the present invention has utility in a variety of applications where sharp thermal discontinuities occur, such as infrared trackers, horizon sensors, dimensional gages, etc., the invention will be described with respect to horizon sensors, and more particularly to those which are responsive to a particular radiation band. For example, such a horizon sensor is shown and described in Patent No. 3,118,063 entitled "Horizon Sensors Selectively Responsive to a Gaseous Atmospheric Component." The invention is described in connection with such a horizon sensor because it is particularly applicable to this type of system, and the need is immediate for greater accuracies in horizon sensors, which the present invention affords. Furthermore, while the system is described in terms of a conical scanning horizon sensor, it is by no means limited to this type. It is equally applicable to a scanner which senses only one edge of the horizon whose position it must determine.

FIG. 1 is shown to illustrate the difficulty in determining the precise horizon edge. The curves on the graph of FIG. 1 illustrates variations in horizon edge radiance which are due largely to latitude and angle differences in the scanning of the earth's horizon by the horizon sensor, with the thermistor bolometer of the horizon sensor generating the earth pulse shown for different geographic regions. The dotted curves on the graph of FIG. 1 represent clouds, and by utilizing a sensor which is responsive only to the carbon dioxide band (14–16$\mu$), whose distribution throughout the atmosphere is quite uniform, radiation irregularities due to clouds are essentially eliminated. As the scan of the horizon sensor moves from the earth to outer space, a drop-off is noted in radiance due to the variations in horizon edge radiance for the different geographic regions of the earth, the precise edge cannot be located. However, it should be noted that the slopes of the earth pulse nearly coincide. Accordingly, this feature is utilized by the present invention to overcome the horizon edge indeterminacy problem. Although the graph shows the sharp thermal discontinuity from the horizon to space, the same result occurs when the scan of the horizon sensor moves from space to the earth's horizon. Having determined that the slopes of the edges of the pulses generated due to thermal discontinuities are nearly coincident regardless of the various edge effects, this information is utilized by the present invention to provide for a correction for different edge radiances, and is illustrated diagrammatically in FIG. 2. In FIG. 2 the leading edges of two pulses having slopes $s_1$ and $s_2$ that intersect at point $t_0$ is shown in graphic form plotted as amplitude versus time. Slice level $a_1$ intersects slope $s_1$ at $t_1$ and slope $s_2$ at $t_2$, while slice level $a_2$ intersects slope $s_1$ at $t_3$ and slope $s_2$ at $t_4$. Accordingly, $$s_1 = \frac{a_2}{t_3 - t_0} = \frac{a_2 - a_1}{t_3 - t_1}$$

so $$\text{correction required} = t_3 - t_0 = (t_3 - t_1)\left(\frac{a_2}{a_2 - a_1}\right)$$

where $t_3 - t_1$ is measured pulse duration and $$\frac{a_2}{a_2 - a_1}$$

is scale factor. Likewise, $$\text{slope } s_2 = \frac{a_2}{t_4 - t_0} = \frac{a_2 - a_1}{t_4 - t_2}$$

and $$\text{correction} = t_4 - t_0$$
$$= (t_4 - t_2)\left(\frac{a_2}{a_2 - a_1}\right)$$

Accordingly, generating a pulse shaped by fixed slice levels will permit the use of the pulse width so generated to correct errors in edge effect. This correction technique may be applied to determine accurately the edge of a single thermal discontinuity or a plurality of thermal discontinuities.

The system for carrying out edge correction for a plurality of thermal discontinuities is shown in the system block diagram of FIG. 3 which will be explained in conjunction with the waveforms shown on FIG. 4. The system includes a sensor 10 which has a means of scanning areas having sharp thermal discontinuities and applying such radiation to a suitable infrared detector. The waveform 40 on FIG. 4 shows a planet pulse 40 which is obtained from the sensor 10 scanning the earth's horizon. As will be apparent, the shape of the pulse 40 is more trapezoidal than rectangular, which is accounted for by the difference in radiance encountered as the sensor 10 scans over the earth. The output of the sensor 10 is applied to a preamplifier 12 and then to a bistable level-sensitive device 14 which generates a pulse 42 when level $a_2$ as shown with respect to waveform 40 is exceeded by the detector output from the earth. The pulse 42 is applied to a modulator 18 which also has applied thereto a pulse from a frame reference pulse generator 16. The frame reference pulse generator 16 may comprise a magnetic means of the type shown in the aforesaid Merlen patent or a photoelectric means which generates a pulse at predetermined intervals in the scan cycle of the sensor 10. The modulator 18 may be in the form of a simple gate having fixed reference voltages which merely switches the polarity of the pulse 42 at the occurrence of the reference pulse, to produce an output such as waveform 44. The waveform 44 is applied to an integrator 20 which produces an error signal based simply on the deviation of occurrence of the reference pulse with respect to slice level $a_2$ as set by the bistable level-sensitive device 14. This constitutes the main signal channel of the horizon sensor, and is like the type of correction which was utilized in the aforesaid Merlen patent.

The system also includes an auxiliary correction channel having a second bistable level-sensitive device 22 which is coupled to the output of the preamplifier 12. The bistable level-sensitive device 22 is actuated to generate a waveform 45 when the output of the sensor 10 exceeds level $a_1$, as shown on waveform 40. The output of level-sensitive device 22, as well as that of level-sensitive device 14, is fed via directional diodes to both flip-flops 24 and 26. The outputs of flip-flops 24 and 26 are fed to gates 28 and 30, respectively. The gate 28 has a fixed negative reference voltage applied thereto, and the gate 30 has a fixed positive reference voltage applied thereto, so that the amplitudes of pulses from the gates 28 and 30 are the same. As the planet pulse 40 is being formed with an increasing leading edge, level-sensitive device 22 switches on when level $a_1$ is reached on the leading edge of pulse 40, which, in turn, generates waveform 45 and activates flip-flop 26. When level $a_2$ is reached on the planet pulse 40 on the leading edge thereof, level-sensitive device 14 is actuated, generating pulse 42 which also activates flip-flop 26, thereby forming the positive-going pulse in waveform 46 which is generated by the gate 30. On the trailing edge of pulse 40 the reverse takes place, with flip-flop 24 and gate 28 generating a negative-going pulse as shown in waveform 46.

The combined output from gates 28 and 30 are applied to an integrator 32 to produce a correction signal which is combined at terminal 34 with the output from the main signal channel, providing for an accurate correction for any edge errors which occur. The output from the integrator 32 is also applied to a positive threshold circuit 46, and from there to a reset circuit 38 which is coupled to the integrator 32 as well as to the input of the flip-flop 26. The positive threshold 36 and reset circuit 38 provide a means for taking the error signal channel out of operation when level-sensitive device is prematurely activated by noise.

FIG. 5 is illustrative of the type of circuitry which may be employed for using the difference in pulse duration as the error correcting signal. The bistable level-sensitive means 14 and 22 are conventional Schmitt trigger circuits which feed transistor flip-flops 24 and 26. The bistable level-sensitive means 14 and 22 do not necessarily have to be Schmitt triggers, but may be Merlen triggers as disclosed in Patent 3,109,943, or any other type of circuit which performs the same function. The conventional flip-flops 24 and 26 feed conventional transistor gate circuits 28 and 30, respectively. The gates 28 and 30 have fixed reference potentials applied thereto, so that their outputs will have the same amplitude whether the output thereof is in a positive or in a negative direction. As will be obvious to those skilled in the art, the flip-flop and gate circuits may be combined as long as constant amplitude pulses are generated in response to the bistable level-sensitive devices. The outputs of gates 28 and 30 are applied to an integrating circuit 32 in the following manner: A reference signal generator 50 which is of conventional magnetic or photoelectric type, for example the magnetic type as shown in the aforesaid horizon sensor patents, feeds a reference signal at the beginning and end of the scan cycle of the sensor to a flip-flop 52 which activates a relay 54, closing switch 56 to point 58, corresponding to a reference pulse generated at the beginning of the scan cycle. Pulse output from gate 30 builds up a charge on a capacitor 60 through the switch 56, which charge is applied via switch 56 to contact 60 on the occurrence of another reference pulse generated near the end of the scan cycle of the sensor. Accordingly, the outputs of the gates 28 and 30 are applied to the integrating circuit 32, and from there are combined with the output of the main signal channel to provide the error signal. However, if noise occurs, actuating the bistable level-sensitive device 22 before the first slice level is reached on the horizon scan, the positive charge builds up on capacitor 60 for a time longer than the expected horizon crossover time, which activates the positive threshold circuit 32, firing the reset trigger circuit 38, and activating a transistor 64 to short out the charge on capacitor 60. Accordingly, when the switch 56 is connected to point 60, nothing is applied to the integrating circuit, and the error correction channel has been reset for the next scan cycle. This insures that the error signal channel does not generate a faulty error signal due to noise. With the reset trigger circuit making the error channel insensitive to noise during the space scan, the system has inherently considerable immunity to noise even if threshold level $a_1$ is set corresponding to a very low radiation level.

In setting slice levels $a_1$ and $a_2$, it must be kept in mind that a processable pulse width is necessary. Further, it is desirable to have as large a comparison as possible, which would mean setting levels 1 and 2 as far apart as possible. The level limit will be controlled by the necessity of keeping the slice levels on the linear portion of the slope and will also be controlled by the noise at the bottom of the slope as well as irregularities on the top of the slope. When a particular band of radiation is utilized, as in the 14–16μ carbon dioxide band horizon sensor, more uniform radiance is obtained so that the slice level $a_1$ may be set relatively low. With high radiance scanners such as the Merlen horizon sensor, the high level of radiance allows a high enough upper slice level to provide a reasonable comparison. Of course, if no clouds are present, the application of the present invention to the Merlen type sensor will have the same merit as when applied to the carbon dioxide band horizon sensor.

Digital processing may be utilized for a conical scan sensor which employs the double slice level slope correction principles already described in some detail. The circuit of FIG. 3 may be modified as shown in FIG. 6, which illustrates a method of employing digital processing. Referring now to FIG. 6, a reticle 62 is provided which is a part of the scanning optical system of the sensor 10. A reference generator 66 is provided for producing a reference pulse R which occurs at prescribed fixed points in each scan cycle, which is similar to reference generator 16 of FIG. 3. In FIG. 6, however, a pulse current reference generator 64 is also included for generating a series of pulses P. The pulse count P is generated by a light source photodiode unit which straddles the reticle 62, the reticle having alternate opaque and transparent segments to generate a series of pulses. The reference pulse R is derived from the same reticle with the pulses being considerably longer in duration and occurring only at fixed reference points in each scan. FIG. 6 also includes gates 70, 72, 76, 78, and 82, and counters 74 and 80 which are connected as shown. In operation, when a fixed reference point is passed on the reticle 62, the reference pulse generator 66 produces a positive-going signal, reference pulse R. The reference pulse R is applied to gates 72, 82 and 76, and it acts to close gates 72 and 82 and to inhibit gate 76. In response thereto, counter 74 begins forward counting the pulses P generated by the pulse count generator 64. In the meantime counter 80 counts in reverse. When level $a_1$ is reached, level-sensitive device 22 is activated, generating a pulse which switches flip-flop 24 to start a positive-going pulse which terminates through the actuation of level-sensitive device 14, at time $t_2$. When slice level $a_2$ is reached at time $t_2$, the level-sensitive device 14, in addition to stopping the aforementioned pulse, generates a positive signal lasting until time $t_4$, which is used to disable gate 72 which, in turn, terminates the forward count of counter 74. It also enables the reverse count gate 70, which remains active for the duration of the correction pulse ($t_2-t_1$) times the weighting factor K which is established by the integrator 28 time constant, after which the reverse count terminates. Counter 74 is thus left with a number representing the angle $\theta_1$ which is from the reference point of pulse R to a corrected horizon position.

Counter 80, which has been counting in reverse from the $t_0$ reference point, continues until the reference point R returns to zero at time $t_3$ through its enabling gate 82. The reference pulse R is also used to disable gate 76 until time $t_3$. At this time, because of the return of reference pulse R to zero and the appearance of a positive signal from the level-sensitive means 14, gate 76 is enabled and allows counter 80 to forward count the pulses P generated by the pulse count generator 64. The forward count continues through gate 76 until time $t_4$ when the earth signal drops below the threshold level of level-sensitive means 14. The forward count is prolonged through closure of gate 78 for a period $t_5-t_4$ times the weighting factor K provided by integrator 30, thus correcting the second angle $\theta_2$ to represent an identical position of the horizon edge for the trailing horizon crossover as was established for the leading edge of the horizon scan.

To summarize counter operation, counter 74 begins the forward count at $t_0$ when the positive reference pulse R is generated, and stops at $t_2$ which is the upper threshold level for level-sensitive device 14. A reverse count then takes place for the duration of integrator 28 output, and then stops. With respect to counter 80, a reverse count is initiated at time $t_0$ which stops at time $t_3$, corresponding to the end of reference pulse R, and a forward count is initiated to time $t_4$, which has added thereto the integrator 30 output pulse duration, and then stops. The cycle is then repetitive for additional scan cycles.

A single-axis system has been described, but it will be apparent that plural axis systems are encompassed within the present invention by merely duplicating the single axis circuitry as shown. It will also be apparent that the invention has application to all types of scanning radiometers for recording sharp thermal discontinuities which in every application will have some degree of edge error. The invention, of course, will be employed where greater accuracy is required in locating a line of thermal discontinuity.

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What we claim as new and desire to secure by Letters Patent is:

1. A system for correcting edge errors in a scanning radiometer which in a given scan cycle crosses at least one point of sharp thermal discontinuity, comprising
    (a) a detector which is adapted to be scanned across an object having a point of thermal discontinuity at the outer extremities thereof and which produces a signal therefrom having sloping edges corresponding to the points of thermal discontinuity,
    (b) a first and a second bistable level-sensitive means coupled to said detector which are operative at predetermined levels of the sloping edges of the detector signal,
    (c) a reference pulse means,
    (d) a main signal channel which includes said detector and said first bistable level-sensitive means for generating a signal in accordance with a modulated output from the combination of outputs from the first bistable level-sensitive means and said reference pulse means,
    (e) a correction signal channel including said second bistable level-sensitive means which is coupled to said detector and has the output of said first bistable level-sensitive means coupled thereto for generating an error signal representing the time difference between the predetermined levels set by said first and second bistable level-sensitive means at points of thermal discontinuity, and
    (f) means for combining the signals of said main signal channel and said correction signal channel to provide an output which is capable of correcting for edge errors produced by the detector in scanning the object.

2. The system set forth in claim 1 wherein said first and second bistable level-sensitive means are trigger circuits.

3. The system set forth in claim 1 wherein the correction signal channel includes first and second pulse generating means coupled to said first and second bistable level-sensitive means for generating pulses having pulse widths corresponding to time intervals between the levels of said first and second level-sensitive means and polarities depending on whether the detector output is increasing or decreasing.

4. The system set forth in claim 3 wherein the outputs of said main signal channel and said correction signal channel are integrated before being combined.

5. The system set forth in claim 3 including means for disabling said correction signal channel when said first pulse generating means generates a pulse which is longer than a predetermined interval.

6. The system set forth in claim 5 wherein said means for disabling said system includes a positive threshold circuit connected to the integrated output of said correction signal channel and means actuated by said positive threshold circuit for shorting out the integrated output of said correction signal channel and resetting it for the next scan cycle.

7. A system for correcting edge errors in a scanning radiometer comprising
  (a) an infrared detector which is adapted to scan to detect thermal discontinuities,
  (b) a first bistable level-sensitive means connected to said detector for receiving detector output,
  (c) a second bistable level-sensitive means connected to said detector for receiving detector output,
  (d) modulation means connected to said first bistable level-sensitive means for modulating output of said first bistable level-sensitive means with a reference signal,
  (e) first integration means for integrating the output of said modulation means,
  (f) first and second pulse generating means coupled to said first and second level-sensitive means for generating pulses having pulse widths corresponding to time intervals between the levels of said first and second level-sensitive means and polarities depending on whether the detector output is increasing or decreasing between the levels set by the first and second level-sensitive means,
  (g) second integration means for integrating the pulses from said first and second pulse generating means, and
  (h) means for combining the outputs of said first and second integrating means to produce an error signal which may be used for compensating the edge errors.

8. The system set forth in claim 7 wherein said first and second pulse generating means comprises a flip-flop and gate circuit.

9. The system set forth in claim 8 wherein said first and second bistable level-sensitive means are trigger circuits.

References Cited

UNITED STATES PATENTS

| 3,090,583 | 5/1963 | Behun et al. | 250—83.3 X |
| 3,246,160 | 4/1966 | Zuckerbraun | 250—83.3 X |

ARCHIE R. BORCHELT, *Primary Examiner.*